Feb. 23, 1965  G. B. DOREY  3,170,413
HOPPER OUTLET DISCHARGE STRUCTURE
Filed Jan. 5, 1962  6 Sheets-Sheet 1
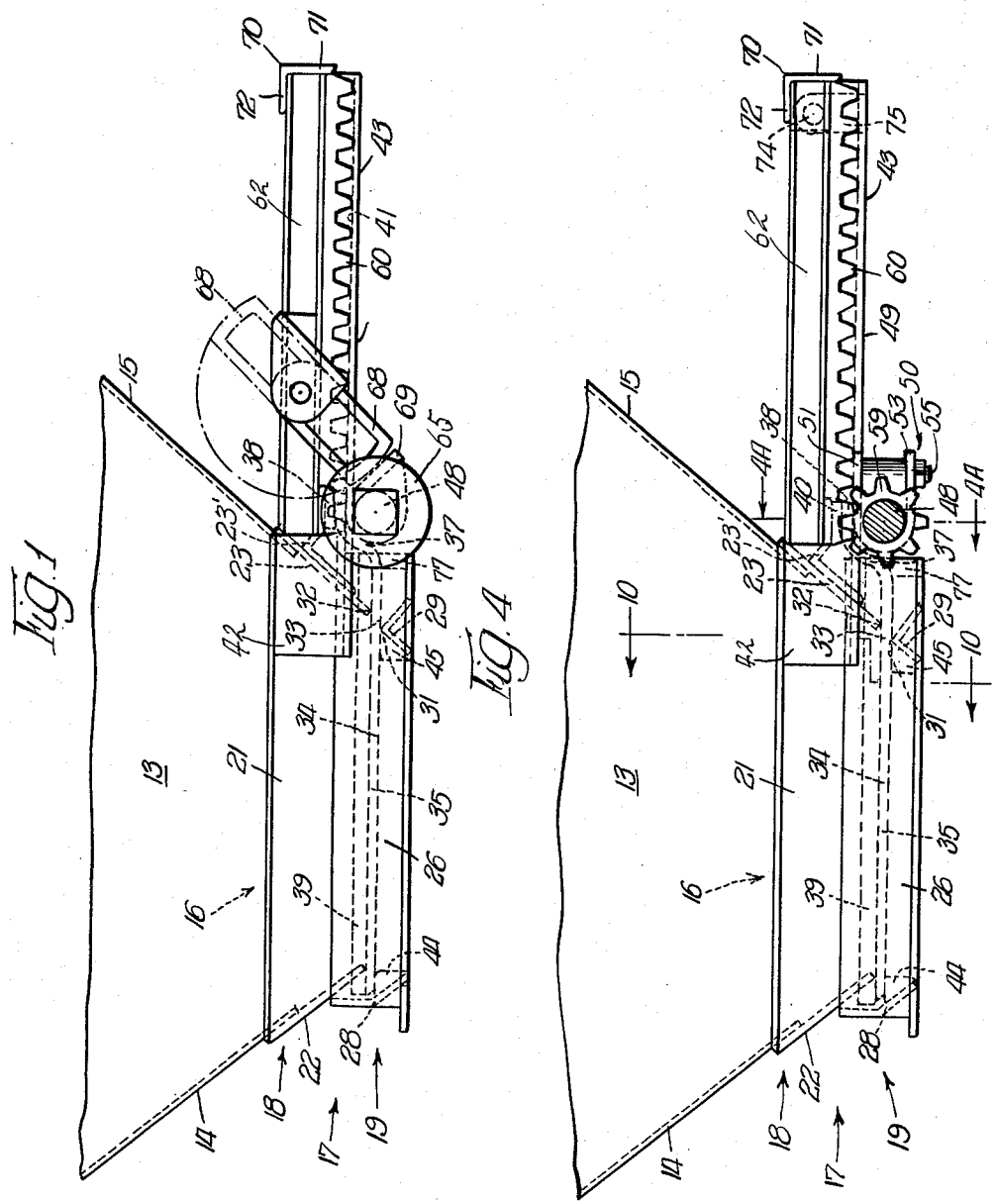
INVENTOR.
George B. Dorey,
BY
Robert R. Lockwood
atty

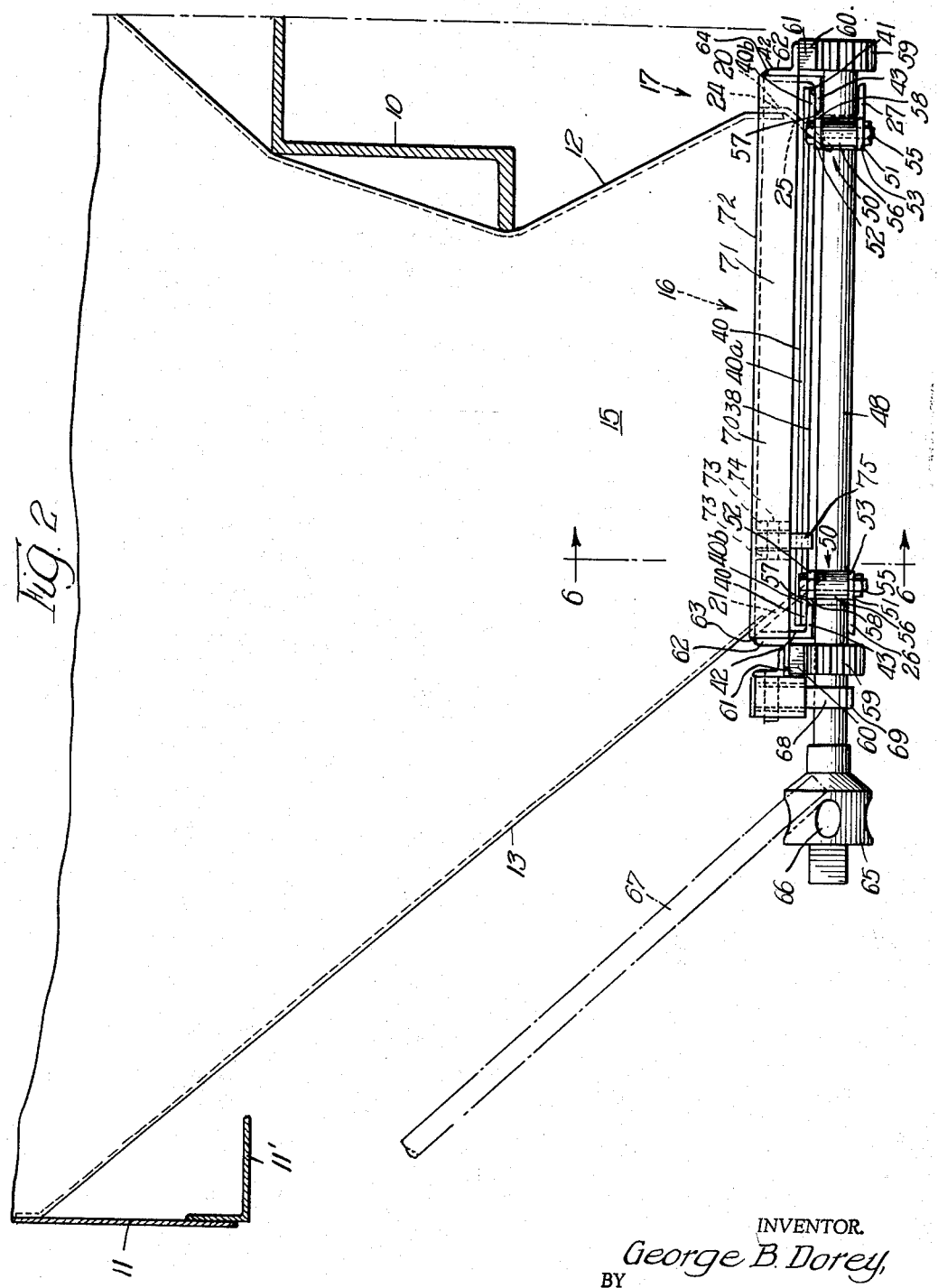

Feb. 23, 1965   G. B. DOREY   3,170,413
HOPPER OUTLET DISCHARGE STRUCTURE
Filed Jan. 5, 1962   6 Sheets-Sheet 3
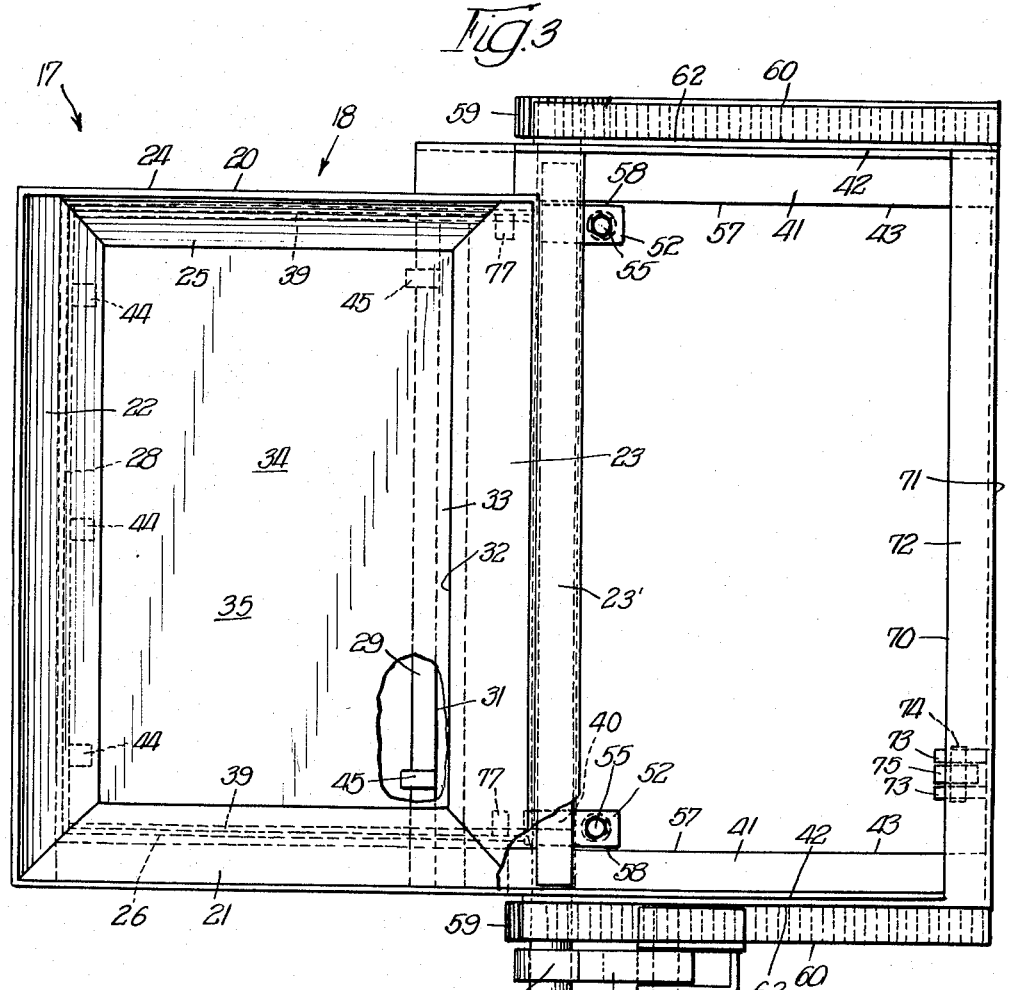
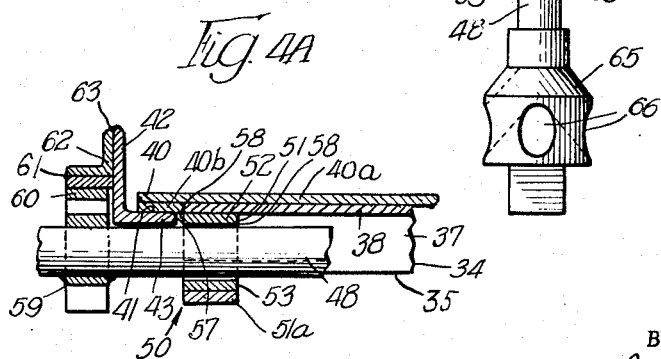
INVENTOR.
George B. Dorey,
BY Robert R. Lockwood
ATTY

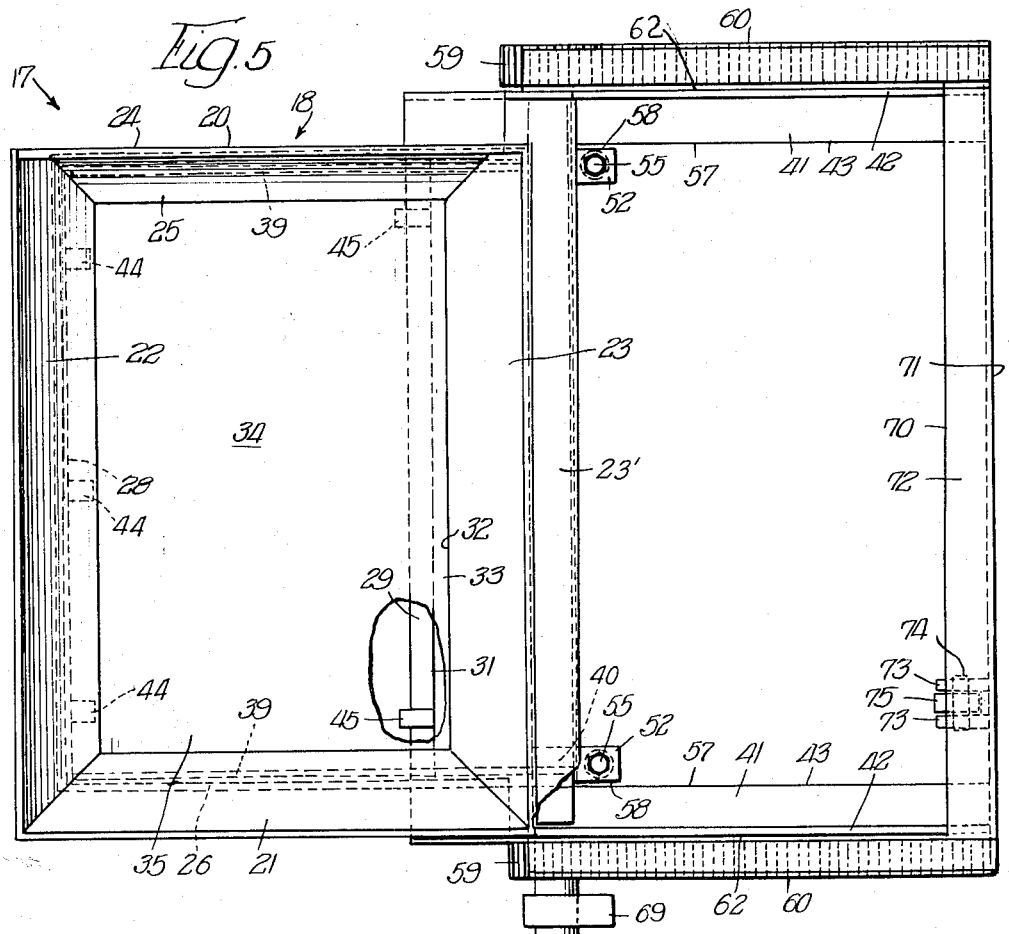
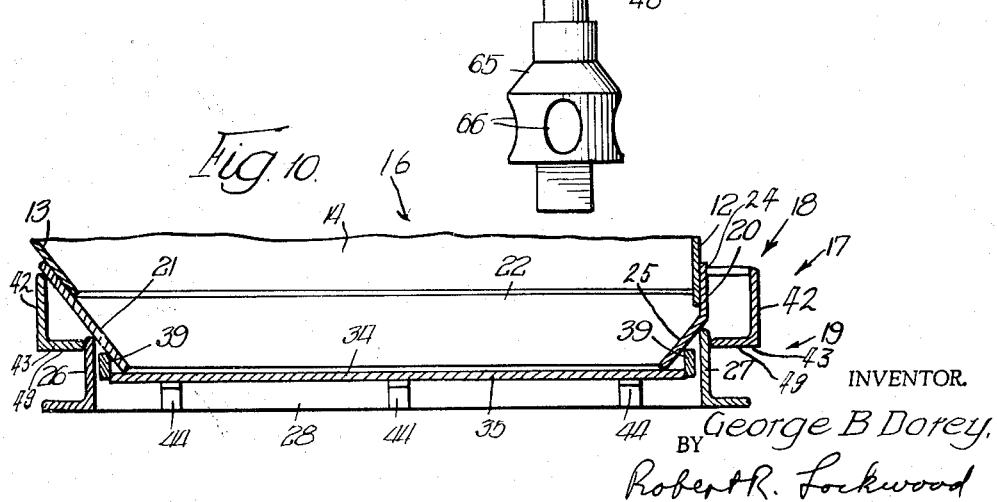

Feb. 23, 1965  G. B. DOREY  3,170,413
HOPPER OUTLET DISCHARGE STRUCTURE
Filed Jan. 5, 1962  6 Sheets-Sheet 5
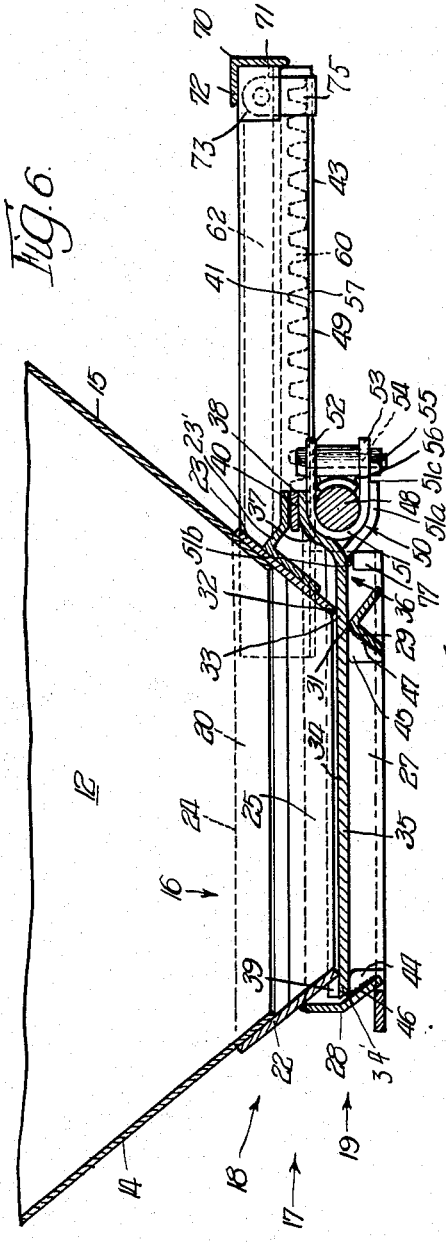
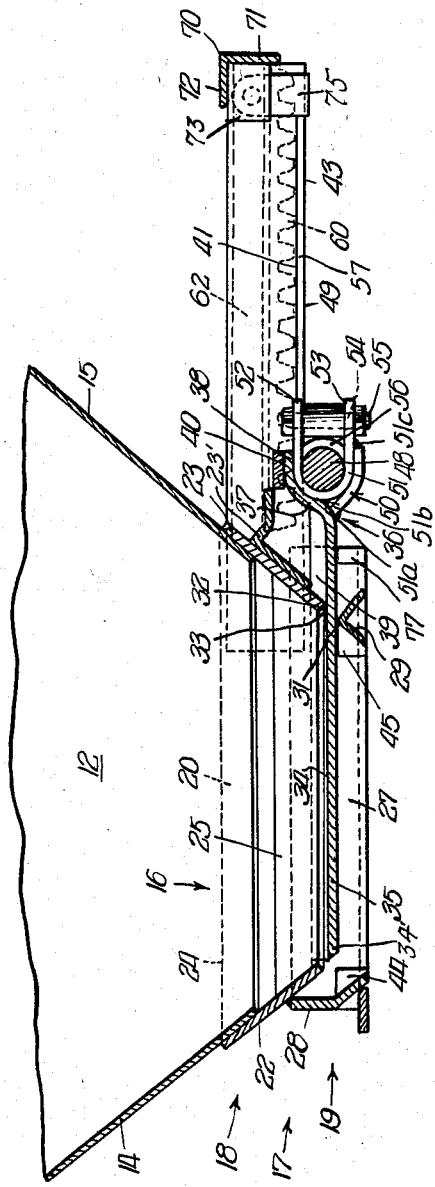
INVENTOR.
George B. Dorey,
BY
Robert R. Lockwood
Atty.

Feb. 23, 1965 G. B. DOREY 3,170,413
HOPPER OUTLET DISCHARGE STRUCTURE
Filed Jan. 5, 1962 6 Sheets-Sheet 6
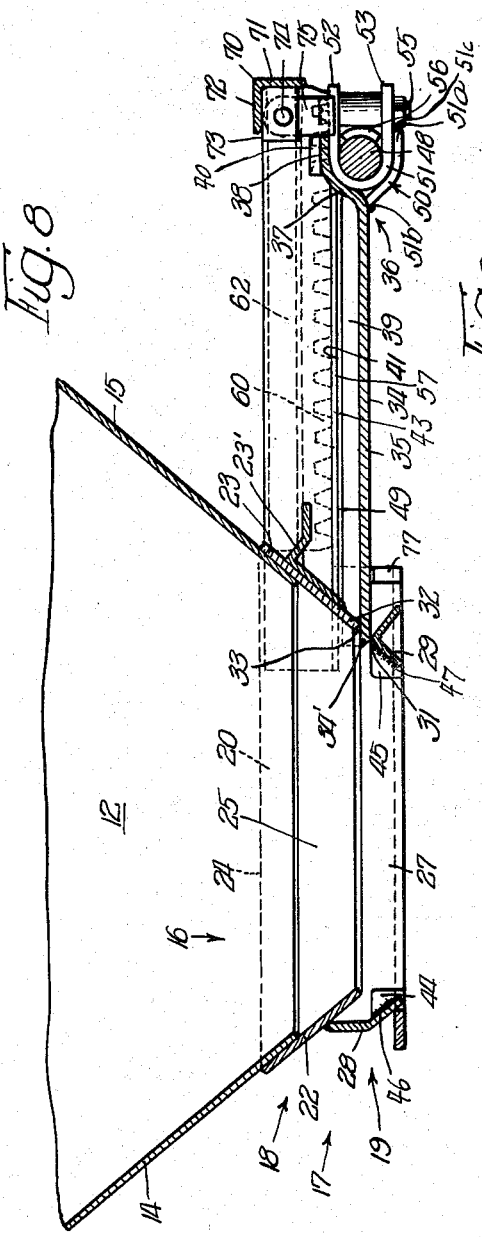
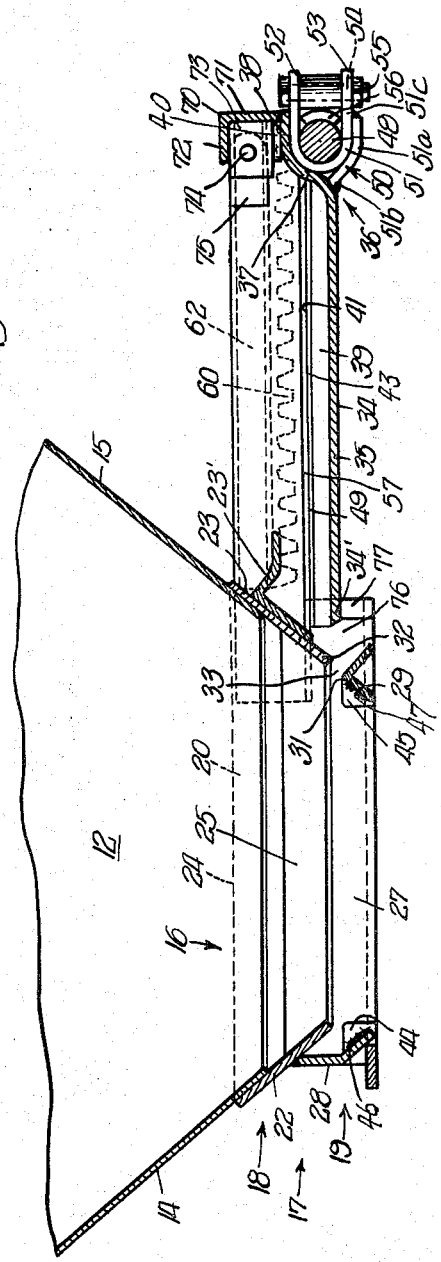
INVENTOR.
George B. Dorey,
BY Robert R. Lockwood
atty

United States Patent Office 3,170,413
Patented Feb. 23, 1965

3,170,413
HOPPER OUTLET DISCHARGE STRUCTURE
George B. Dorey, Westmount, Quebec, Canada, assignor to Enterprise Railway Equipment Company, Chicago, Ill., a corporation of Illinois
Filed Jan. 5, 1962, Ser. No. 164,581
3 Claims. (Cl. 105—282)

This invention relates to an improved hopper discharge outlet structure such as employed for the discharge opening of railway hopper cars and the like.

The invention is of special importance in connection with the handling of lading which has a tendency to cake and solidify upon absorption of moisture. In the handling of such bulk commodities, it has heretofore been customary to support a sliding gate in closed position on runways and ledges located at the sides of the discharge opening. It has been found that such runways and ledges retain residual lading thereon which eventually hardens and hinders the proper operation of the gate.

The present invention is designed to overcome the limitations which are now a source of trouble by eliminating objectionable features and incorporating new principles of operation.

The objects of the invention, among others, are: To provide an outlet structure having a sliding gate for a discharge opening wherein side ledges and side runways are eliminated from the side walls of the discharge opening to provide unobstructed flow of lading; to provide bracket supports for the gate at the respective ends of the discharge opening and spacing said supports laterally from the side walls of the opening; to provide a structure including an operating shaft carried by a sliding gate having limited rocking movement with the elements of the structure so arranged that the shaft performs the double function of limiting rocking movement of the gate and also effecting translatory movement thereof; to provide means for extending opening movement of the gate at will beyond its normal open position and beyond the discharge opening to facilitate removal by brushing a residual lading; and, to provide laterally extending brackets from the gate for supporting the latter on extension runways at a level spaced appreciably above the main body of the gate.

The invention further resides in certain details of construction and refinement of parts such as will be hereinafter described.

For further comprehension of the invention reference may be had to the accompanying drawings wherein the improvement is shown as applied to the hopper of a railway car.

In said drawings:

FIG. 1 is a side elevational view of the lower portion of a so-called hopper car showing as much of the car structure as necessary to illustrate one hopper embodying the improvement, said view showing the gate in closed position.

FIG. 2 is an end elevational view of the structure shown in FIG. 1, as viewed from right to left.

FIG. 3 is a plan view of FIG. 1 with the hopper sheets omitted and with certain parts broken away to better illustrate the construction.

FIG. 4 is a side elevational view similar to FIG. 1 except that the operating handle and locking pawl are omitted to better illustrate the construction.

FIG. 4a is a vertical sectional view taken along line 4a—4a of FIG. 4.

FIG. 5 is a plan view of FIG. 4.

FIG. 6 is a vertical longitudinal sectional view taken on a line 6—6 of FIG. 2 and showing the gate in closed position.

FIG. 7 is a vertical longitudinal sectional view, similar to FIG. 6, except that the gate is shown in partially open position.

FIG. 8 is another vertical longitudinal sectional view, similar to FIGS. 6 and 7, except that the gate is shown in its normally full open position and as limited by a pendently mounted block.

FIG. 9 is still another vertical longitudinal sectional view, similar to FIGS. 6 to 8 inclusive, except that the gate is shown in overextended open position.

FIG. 10 is a vertical transverse sectional view taken on a line 10—10 of FIG. 4.

In said drawings the car structure is indicated in FIG. 2 of a center sill 10 and one of the car side walls 11 having a lower marginal angle 11′. Interposed between the center sill 10 and side wall 11 is a four-sided hopper defined in part by inner and outer side walls, indicated at 12 and 13, respectively, which meet with oppositely sloping transversely disposed walls 14 and 15 to form the four-sided hopper.

The hopper walls 12, 13, 14 and 15 converge inwardly to form a discharge opening 16 which is surrounded by a frame 17 formed of upper and lower sections as indicated at 18 and 19 respectively.

The upper section 18 is a four-sided wall member including walls 20, 21, 22 and 23 which respectively overlie the hopper walls 12, 13, 14 and 15. The wall 20 includes a substantially vertically extending upper portion 24 leading to an inwardly sloping portion 25. Said wall portion 25 in combination with walls 21, 22 and 23 contributes to form a shell-like structure of inverted truncate form which nests within the lower frame section 19 as will be described hereinafter. A reinforcing angle 23′ underlies the wall 23.

The lower frame section 19 is generally composed of side walls 26 and 27 which are connected transversely at one end of the discharge opening 16 by end wall 28. Adjacent the opposite end of the opening 16 the side walls 26 and 27 are connected by a transversely extending member 29 which is preferably of inverted V-shape. The apex 31 of the member 29 is spaced from the lower edge portion 32 of the upper wall 23 to define a slotted opening 33 through which a sliding gate 34 extends to close the discharge opening 16 and control the flow of lading.

The gate 34 preferably consists of a steel plate 35 formed outwardly of the discharge opening 16 with a Z-shaped deformation as generally indicated at 36. Said deformation is formed by bending the plate 35 to present an upwardly extending wall 37 and thence outwardly to dispose a flange 38 lying at an appreciable distance above the upper surface of the plate 35 and forming therewith the Z-shape.

The gate 34, at each side thereof, is provided with an upstanding wall 39 and said walls 39—39 in cooperation with end wall 37 combine to form a three-sided panlike member. The upwardly extending Z-shaped deformation 36 of the gate 34, as will be understood, is disposed entirely outside of the discharge area 16 and constitutes a rigid transversely extending beam member well adapted to brace the gate 34 from side to side thereof. Extending laterally from each side of the Z-shaped deformation 36 of the gate 34 is a bracket 40. The bracket 40 includes a bar 40a secured as by welding to the flange 38 of the gate 34 and, as shown in FIG. 4a, it is formed with extensions projecting beyond the sides of the flange 38. Underlying these extending ends of the bar 40a and secured thereto are bearing plates 40b. The bearing plates 40b seat on runways 41 which extend longitudinally at each side of the gate 34 to support it throughout its full extent of opening movement.

The runways 41 are preferably of angle shape with one of the walls 42 extending vertically and the adjacent wall 43 extending horizontally inwardly to underlie the brackets 40 and form seats therefor throughout the entire range of opening movement of the gate 34.

The gate 34 is further supported fore and aft of the discharge opening 16 by supporting brackets 44 and 45 located at the respective ends of the discharge opening 16. The brackets 44 are carried by the end wall 28 being welding thereto at 46 and the brackets 45 are carried by the transversely extending member 29 and welded thereto at 47. The respective brackets 44 and 45 are spaced laterally away from the side walls 26 and 27 and thereby avoid the formation of such corner pockets as are prone to retain lading.

The gate 34, in the fully closed position, is thus supported at the opposite ends of the discharge opening 16 by the brackets 44 and 45 and upon initial opening movement and withdrawal from the end supports 44, the gate 34 balances on end supports 45 as shown in FIG. 7 and, due to the weight of the lading on the overhanging unsupported area of the gate 34, there is a tendency to downward movement of the latter. Such bias to downward movement is counteracted by a transversely extending operating shaft 48 which is rotatably carried by the gate 34 and disposed below the runways 41—41. It is adapted to contact the undersurfaces 49 of walls 43 of the runways 41, and thereby counteract the downward movement of the overhanging portion of the gate 34.

The operating shaft 48 performs the dual function of counterbalancing the gate 34 and also effecting translatory movement thereof. The shaft 48 is journalled on the gate 34 in open ended bearings 50 which are preferably formed of U-shaped loops 51 having one leg 52 welded to the under side of the flange 38. Each leg 52 and the oppositely facing companion leg 53 of the loops 51 are apertured at 54 for receiving a bolt 55 whereby a segmental bearing section 56 is retained to complete the shaft bearings. The loops 51 are further braced against displacement by means of straps 51a which are welded to the gate 34 at 51b and to the companion leg 53 at 51c.

The bearings 50 are preferably located immediately adjacent the marginal edges 57 of the walls 43 of the runways 41 thereby permitting the marginal edges 58 of the upper legs 52 of the bearings 50 to act as guides for centering the gate 34 between the runways 41 during its movement. The shaft 48 and associated bearings 50—50 are preferably so located as to dispose the shaft 48 immediately beneath the brackets 40 and vertical displacement of the gate 34 is thus limited to the extent of the clearance between the shaft 48 and the under surface 49 of runway wall 43.

The ends of the operating shaft 48 are extended beyond the side runways 41 and are there each provided with a non-rotatably mounted toothed pinion 59. The said pinions 59 mesh with complementary toothed racks 60 which are disposed thereabove. The said racks 60 are preferably welded as indicated at 61 to angle shaped members 62 which in turn are carried by the vertical walls 42 of the runways 41 and welded thereto at 63 and 64.

The shaft 48, at one end thereof, is fitted with a suitable operating handle 65 having a series of socket openings 66 for the accommodation of a removable operating bar 67. Locking means for the shaft 48 include a pivotally mounted dog 68 swingable to engage with an abutment 69 on the shaft 48.

The runways 41 are connected at their distal ends by a transversely extending angle shaped member 70 which is disposed with one wall 71 extending vertically and the adjacent wall 72 extending horizontally to overlie the runways 41. In the angle formed by the said walls 71 and 72 there are disposed a pair of walls 73—73 carrying a pivot 74 on which a blocking plate 75 is pivotally mounted to gravitate to a vertical pendent position. The said blocking plate 75, when in its normal pendent position, lies in the path of movement of the gate 34 as well seen by reference to FIG. 8. The blocking plate 75 is adapted to be fingered to a horizontal position as indicated in FIG. 9 in which position the end of the gate 34 passes beneath the blocking plate 75 and the range of movement of the gate 34 is extended beyond normal travel. When the gate 34 is in its overextended position, FIG. 9, there is a substantial gap as seen at 76 between the frame member 29 and the edge of the gate 34. This allows an opening for complete ejection of residual lading over this edge of the gate 34 after unloading is completed. In said overextended position, the leading end 34' of the gate 34 is supported on brackets 77 carried by the frame side walls 26 and 27.

The operation and advantages of the improvement may be best understood by following out the sequence of movements involved in one opening and closing movement of the gate 34, as follows: Assuming the parts positioned as in FIG. 1, the operator first swings the locking dog 68 to an overbalanced released position as indicated by conventional dot and dash lines. The shaft 48 is then rotated in an anticlockwise direction as viewed in FIG. 1 thereby moving the gate 34 and displacing it from the bearing brackets 44 whereupon it overhangs the brackets 45 to have rocking movement thereon. The rocking action on brackets 45 is counteracted by reason of the shaft 48 contacting the under surfaces 49 of the runways 41. Continued rotation of the shaft 48 in the indicated direction moves the gate 34 to full open position with the outer circular surface of the shaft 48 in rolling and sliding contact with the runways 41. The gate 34, upon reaching its normally open position as seen in FIG. 8, is arrested in its movement by the blocking plate 75 and should sweeping off of the now open gate be indicated, it is moved a slight distance in a closing direction and the plate 75 held in the raised position, as in FIG. 9, to allow movement of the gate 34 therebeneath.

The closing of the gate 34 is a reversal of the operations involved in the opening, the blocking plate 75 being arranged to gravitate to a pendent blocking position upon initial closing movement and subsequent openings will be limited to normal movement until the blocking plate 75 is again lifted.

I claim:

1. A hopper discharge opening closure structure for use in a railroad car and the like having an opening providing for the downward discharge of lading and comprising, in combination, a frame surrounding the opening and having a slotted opening at one end thereof, a sliding gate on said frame projecting through the slot for closing the opening, said end of the projecting portion of the gate being of substantially Z-shape to present an upwardly extending wall and a forwardly projecting flange lying at a higher level than the main body of the gate, runway members on said frame extending from the slotted opening adjacent the runway, brackets extending from the projecting flange of the gate to seat on the runway members, a shaft rotatably carried by the gate and extending beneath the brackets of the gate and mounted in the angle formed by the upwardly extending wall and the flange of the gate, and interengaging rack and pinions carried by the runways and shaft respectively for moving the gate by rotation of the shaft.

2. A hopper discharge opening closure structure for use in a railroad car and the like having an opening providing for the downward discharge of lading and comprising, in combination, a frame surrounding the opening and having a slotted opening at one end thereof, a sliding gate on said frame projecting through the slot for closing the opening, said end of the projecting portion of the gate being of substantially Z-shape to present an upwardly extending wall and a forwardly projecting flange lying at a higher level than the main body of the gate, extension runways on said frame disposed outwardly of the slotted opening having ledges at the sides of the projecting flange, and brackets extending laterally from the respective ends of the gate flange and adapted to seat on the ledges of the adjacent runways.

3. A hopper discharge opening closure structure for use in a railroad car and the like having an opening providing for the downward discharge of lading and comprising, in combination, a frame surrounding the opening and having a slotted opening at one end thereof, a sliding gate on said frame projecting through the slot for closing the opening, said end of the projecting portion of the gate being of substantially Z-shape to present an upwardly extending wall and a forwardly projecting flange spaced at a higher level than the main body of the gate, runway members on said frame extending from the slotted opening at each side of the gate to support the projecting end of the gate, brackets extending laterally from the flange of the gate and seating on the runways, open sided bearings disposed in the angle formed by the upwardly extending wall and flange of the gate, a shaft pivotally mounted in the bearings, and interengaging rack and pinion means carried by the runways and shaft respectively for moving the gate by rotation of the shaft.

References Cited by the Examiner

UNITED STATES PATENTS

| | | | |
|---|---|---|---|
| 1,122,918 | 12/14 | Hart et al. | 105—282 X |
| 2,317,007 | 4/43 | Weniger | 222—542 |
| 2,318,763 | 5/43 | Ditchfield | 222—184 |
| 2,386,702 | 10/45 | McBride | 105—202 |
| 2,640,438 | 6/53 | Dorey | 105—305 X |
| 2,738,734 | 3/56 | Dorey | 105—282 |
| 2,738,739 | 3/56 | Dorey | 105—282 |
| 2,778,319 | 1/57 | Dorey | 105—282 |
| 2,791,973 | 5/57 | Dorey | 105—282 |
| 2,810,356 | 10/57 | Dath | 105—308 |
| 2,901,984 | 9/59 | Dorey | 105—282 |
| 2,989,931 | 6/61 | Joy | 105—305 X |
| 2,993,452 | 7/61 | Dorey | 105—282 |
| 3,035,530 | 5/62 | Meyers et al. | 105—308 |
| 3,066,618 | 12/62 | Gunnison | 105—282 |
| 3,082,703 | 3/63 | Dorey | 105—282 |
| 3,085,517 | 4/63 | Smith | 105—282 |

LEO QUACKENBUSH, *Primary Examiner.*